(12) United States Patent
Zeng et al.

(10) Patent No.: US 11,504,875 B2
(45) Date of Patent: Nov. 22, 2022

(54) STAMPING TRAY

(71) Applicant: Ur Materials Industry (ShenZhen) Co., Ltd., Shenzhen (CN)

(72) Inventors: Jiang Zeng, Shenzhen (CN); Chao-Xiang Feng, Shenzhen (CN)

(73) Assignee: Ur Materials Industry (ShenZhen) Co., Ltd., Shenzhen (CN)

( * ) Notice: Subject to any disclaimer, the term of this patent is extended or adjusted under 35 U.S.C. 154(b) by 239 days.

(21) Appl. No.: 16/892,499

(22) Filed: Jun. 4, 2020

(65) Prior Publication Data

US 2021/0291398 A1 Sep. 23, 2021

(30) Foreign Application Priority Data

Mar. 20, 2020 (CN) .......................... 202020372858.1

(51) Int. Cl.
*B26F 1/44* (2006.01)
*B23D 79/10* (2006.01)

(52) U.S. Cl.
CPC ................ *B26F 1/44* (2013.01); *B23D 79/10* (2013.01); *B26F 2001/4445* (2013.01); *B26F 2001/4463* (2013.01)

(58) Field of Classification Search
CPC .......... B23D 79/10; B23D 79/02; B65D 1/34; B65D 1/36
USPC ........................................ 206/562, 563, 564
See application file for complete search history.

(56) References Cited

U.S. PATENT DOCUMENTS

| | | | | |
|---|---|---|---|---|
| 3,578,235 A | * | 5/1971 | Weiss ....................... | B65D 1/36 229/120.07 |
| 5,450,959 A | * | 9/1995 | Philippi ............... | H05K 3/0052 206/564 |
| 2003/0146128 A1 | * | 8/2003 | Sakai ................... | B65D 5/5021 206/583 |
| 2010/0243512 A1 | * | 9/2010 | Hardy .................... | B65D 85/42 206/563 |
| 2011/0132789 A1 | * | 6/2011 | Peng ....................... | B65D 1/36 206/505 |

* cited by examiner

*Primary Examiner* — Jennifer S Matthews
(74) *Attorney, Agent, or Firm* — ScienBiziP, P.C.

(57) ABSTRACT

A stamping tray includes a tray body and a base board. The tray body defines a number of mounting grooves for receiving workpieces to be scrapped. The base board is located on a side of the tray body away from the mounting grooves. Each of the mounting grooves defines a through hole extending to the base board.

11 Claims, 3 Drawing Sheets

STAMPING TRAY

FIELD

The subject matter herein generally relates to a stamping tray for scrapping a plurality of workpieces.

BACKGROUND

Generally, in the recycling process of components, workpieces need to be destroyed and scrapped in order to retrieve the components to be recycled. However, the workpieces are generally carried on a pallet, and the workpieces are scrapped by a stamping device, which may damage the pallet.

BRIEF DESCRIPTION OF THE DRAWINGS

Implementations of the present disclosure will now be described, by way of embodiments, with reference to the attached figures.

DETAILED DESCRIPTION

Figure 1:
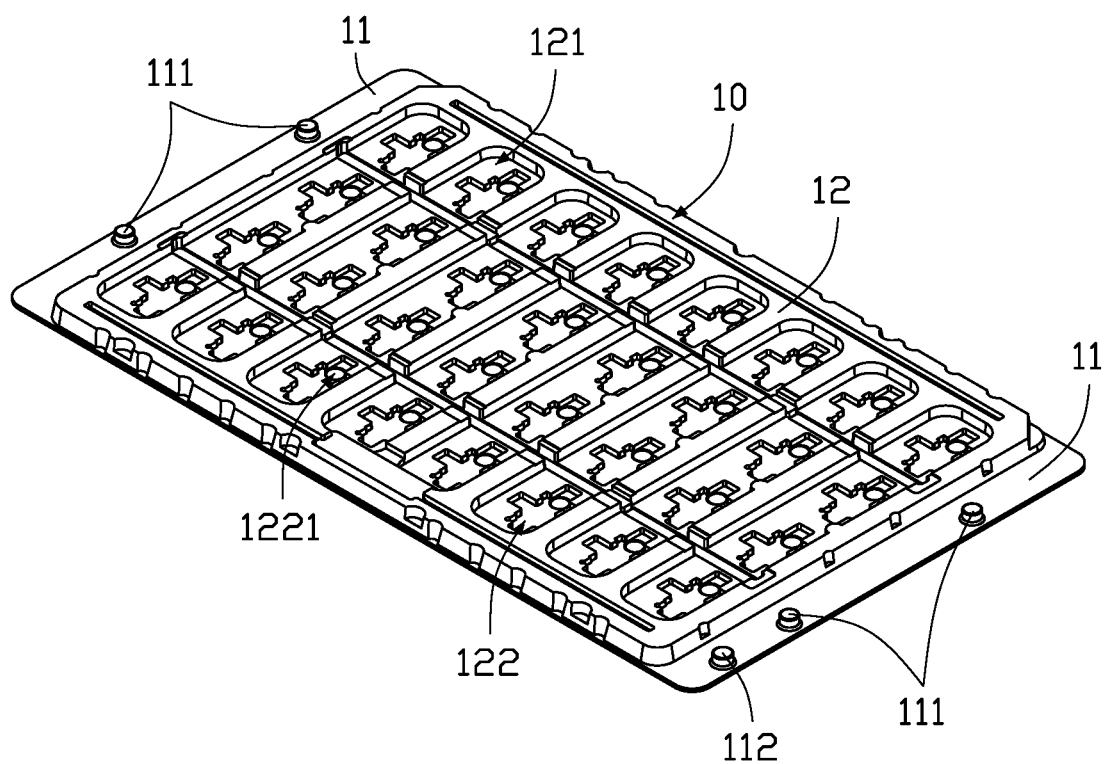
FIG. 1 is an assembled, isometric view of an embodiment of a stamping tray.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

Figure 2:
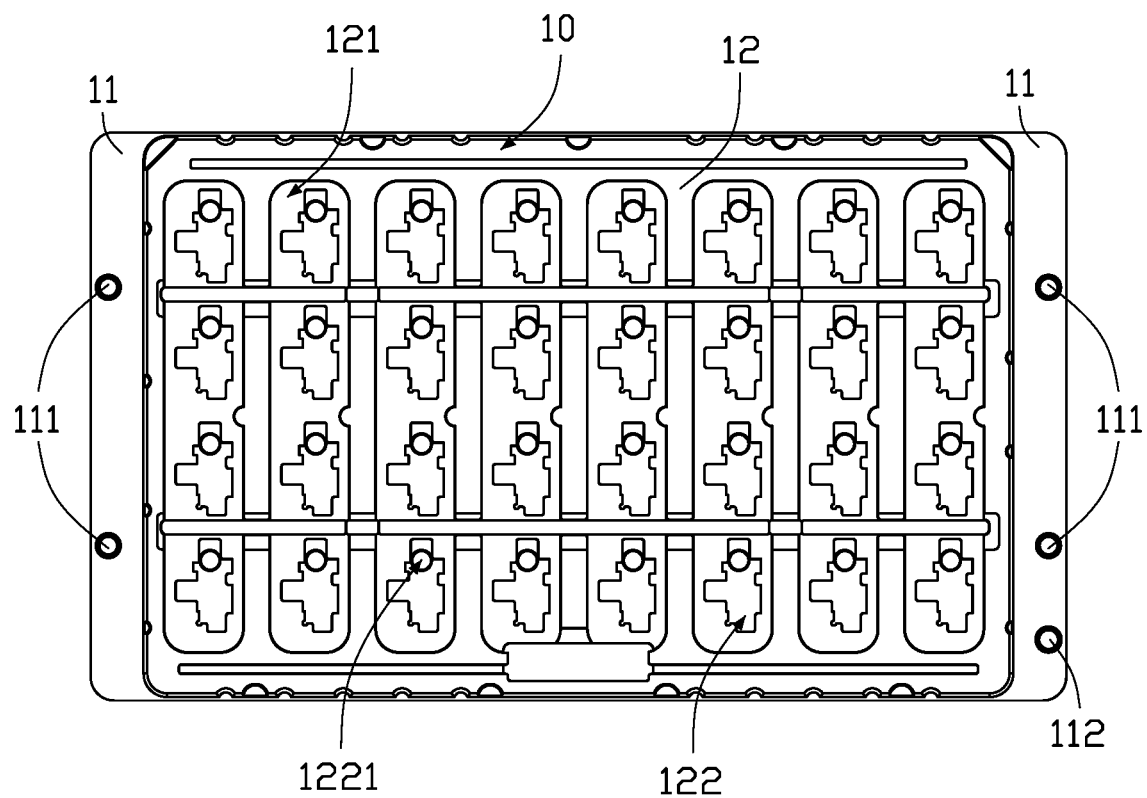
FIG. 2 is a top view of the stamping tray in FIG. 1.
Figure 3:
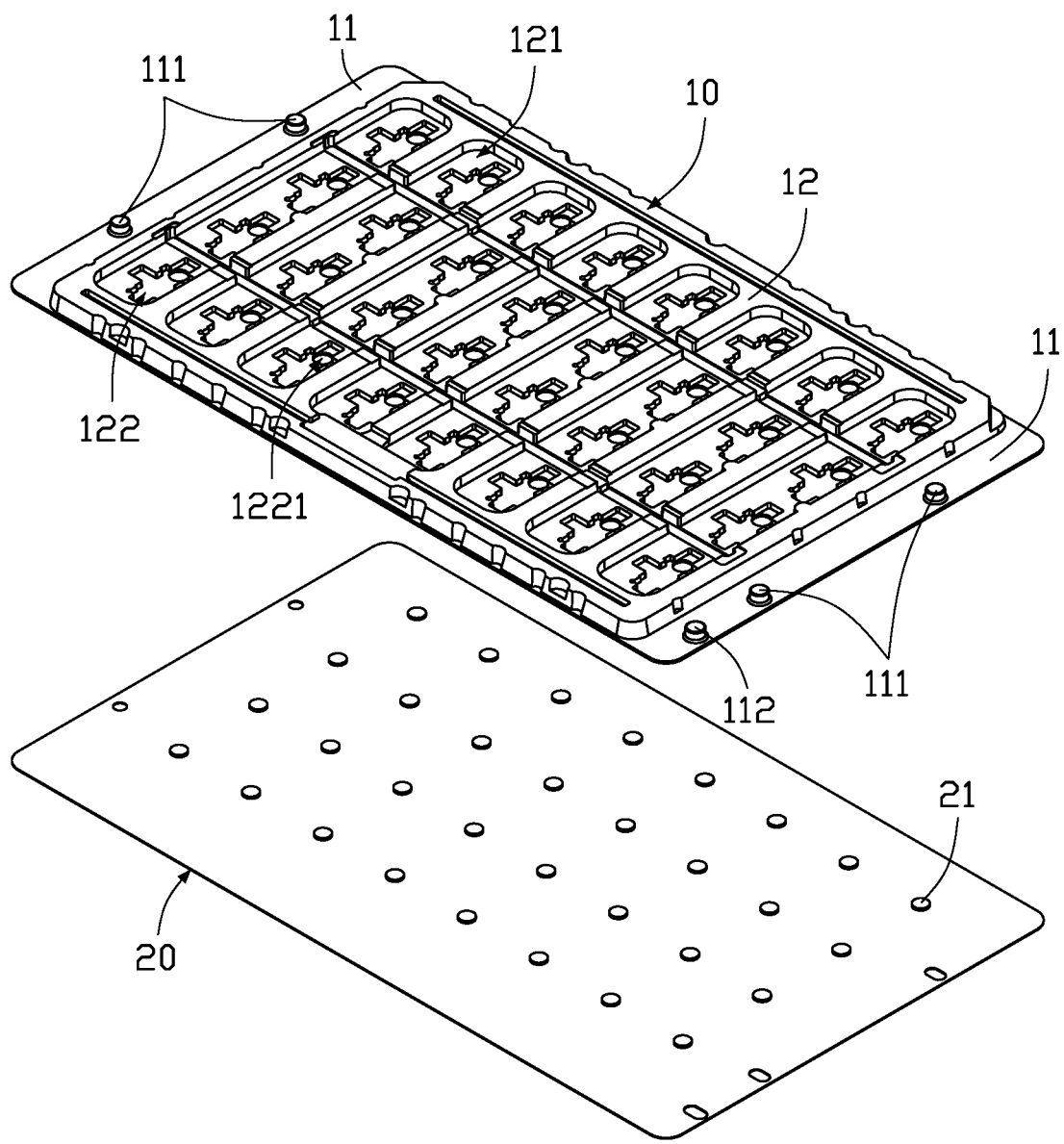
FIG. 3 is an exploded, isometric view of the stamping tray in FIG. 1.

FIG. 1, FIG. 2, and FIG. 3 show an embodiment of a stamping tray 100 for loading workpieces to be scrapped. The stamping tray 100 includes a tray body 10, and a plurality of mounting grooves 122 are defined in the tray body 10 for receiving workpieces. A through hole 1221 is defined in each of the mounting grooves 122. The stamping tray 100 further includes a base board 20. The base board 20 is located on a side of the tray body 10 facing away from the mounting grooves 122. The through holes 1221 extend to the base board 20. The base board 20 absorbs an impact force of the workpiece during stamping to improve a service life of the stamping tray 100.

Referring to FIG. 1 and FIG. 2, the tray body 10 carries a plurality of workpieces to move with an external conveying device. The workpieces are scrapped under the action of an external stamping device. The workpieces include, but are not limited to, terminal components such as a vibration motor, a CPU, and a speaker. In a specific embodiment, the tray body 10 is substantially rectangular, and the tray body 10 is made of polyethylene terephthalate (PET). It can be understood that the shape and material of the tray body 10 are not limited thereto. In other embodiments, the tray body 10 may be in the shape of a circle, a square, an ellipse, etc. The material of the tray body 10 may be other plastic materials.

The tray body 10 may be multiple colors to carry workpieces of different colors, so that the workpieces are easily recognized by the stamping machine during a stamping and scrapping process. For example, in a specific embodiment, if the workpieces to be scrapped are silver-white, the tray body 10 with a black color is selected to carry the workpieces. Thus, damage to the tray body 10 from being unidentified or having incomplete scrapping of the workpieces when the colors of the tray body 10 and the workpieces are similar is prevented. It can be understood that the color of the tray body 10 may also be white or other colors.

The tray body 10 is provided with two mounting ends 11 and a stamping portion 12. The two mounting ends 11 are located at both ends of the stamping portion 12, and the stamping portion 12 is located between the two mounting ends 11.

Each of the two mounting ends 11 is provided with positioning members 111.

There is a plurality of positioning members 111, and the tray body 10 is placed on the base board 20 through the plurality of positioning members 111. A foolproof member 112 is located on one of the two mounting ends 11 to determine an installation direction of the two mounting ends 11 to prevent inaccurate scrapping of the workpieces and damage to the stamping equipment. Further, the plurality of positioning members 111 and the foolproof member 112 are hollow, and the stamping tray 100 is mounted onto the base board 20 through the hollow portions of the positioning members 111 and the foolproof member 112. The specific positions of the plurality of positioning members 111 and the foolproof member 112 are adapted to the installation position of the external conveying device. As in a specific embodiment, the plurality of positioning members 111 and the foolproof member 112 are randomly distributed on the two mounting ends 11. In another embodiment, the plurality of positioning members 111 are uniformly and symmetrically distributed on the two mounting ends 11. It can be understood that the shapes of the plurality of positioning members 111 and the foolproof member 112 can be varied, including but not limited to, cylindrical, elliptical, square, etc.

A plurality of stamping grooves 121 are defined at even intervals on the stamping portion 12, and the plurality of mounting grooves 122 are arranged at even intervals in each of the stamping grooves 121. The plurality of mounting grooves 122 are used to place the workpieces. The stamping groove 121 is adapted to an external stamping head. In order to achieve accurate scrapping of the workpieces in the plurality of mounting grooves 122, the efficiency of scrapping the workpieces is improved.

The stamping grooves 121 are elongated grooves, which are closely spaced on the stamping portion 12. When the base board 20 and the stamping tray 100 move with the conveying device to the stamping device, the stamping device controls the stamping head to stamp into the stamping grooves 121 to stamp the workpieces, thereby scrapping the workpieces. It can be understood that the shape of the stamping groove 121 may be circular, triangular, or the like.

Moreover, the number of the stamping grooves 121 is determined according to actual needs.

The mounting grooves 122 are used to place and fix the workpieces for stamping. Further, the shape of the mounting grooves 122 is adapted to the shape of the workpieces to prevent the workpieces from shifting during stamping. Each of the mounting grooves 122 defines the through hole 1221, and the stamping tray 100 is sleeved on the base board 20 through the through holes 1221. It can be understood that the shapes of the through holes 1221 are not limited thereto.

The number of the stamping grooves 121 and the mounting grooves 122 is not limited, and the specific number is based on actual requirements. In a specific embodiment, the number of the stamping grooves 121 is eight. The eight stamping grooves 121 are evenly juxtaposed on the tray body 10, and each of the eight stamping grooves 121 evenly defines four mounting grooves 122. It can be understood that the number of the stamping grooves 121 and the mounting grooves 122 is determined by the stamping head of the external stamping device.

Referring to FIG. 3, the base board 20 may be, but is not limited to, a metal plate such as a steel plate and a copper plate. The base board 20 is placed on a conveying device, and a plurality of compression members 21 is provided on the base board 20. The shapes of the through holes 1221 match the shapes of the compression members 21. The tray body 10 is placed on the base board 20, and one end of each of the compression members 21 passes through the respective through hole 1221 and extends into the mounting groove 122. The workpieces are placed in the mounting grooves 122, and one side of the workpieces bears against the one end of the compression members 21. In a specific embodiment, the base board 20 is a metal plate, and the plurality of compression members 21 provided on the base board 20 corresponds to the through holes 1221 in number. In a process of scrapping the workpieces, the external stamping device stamps the workpieces, and the compression members 21 absorb an impact on the tray body 10, thereby extending a service life of the tray body 10. Moreover, the tray body 10 is placed on the base board 20. After the stamping is completed, the tray body 10 is separated from the base board 20, which facilitates recovery of the workpieces.

Before operation, the base board 20 is placed on the external conveyor, and the corresponding tray body 10 is selected according to the color of the workpieces to be scrapped. The tray body 10 is sleeved on the compression members 21 through the through holes 1221, and the upper end of the compression members 21 extends into the mounting grooves 122. The workpieces are placed in the plurality of mounting grooves 122, and one side of the workpieces bears against the compression members 21. The compression members 21 correspond in position to the stamping position. The external conveying device drives the base board 20 and the tray body 10 to the stamping device. The stamping device drives the stamping head to move into one of the stamping grooves 121, and gradually press the workpiece until the workpiece is damaged. The compression members 21 absorb the impact to increase the service life of the tray body 10. Then, the stamping device drives the stamping head to move away from the stamping groove 121, and the base board 20 and the tray body 10 are driven by the conveying device to position a next stamping groove 121 to the stamping device for stamping, and the process is repeated. After the scrapping of the workpieces is completed, when the tray body 10 is removed, the workpieces are separated from the compression members 21. The compression members 21 are separated from the tray body 10, and the tray body 10 limits the workpieces within the mounting grooves 122, which facilitates recovery of the workpieces.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A stamping tray comprising:
a tray body defining a plurality of mounting grooves for receiving workpieces to be scrapped; and
a base board located on a side of the tray body away from the plurality of mounting grooves, the base board comprises a plurality of compression members, the tray body is sleeved on the base board by the plurality of compression members passing through the plurality of through holes;
wherein:
each of the plurality of mounting grooves defines a through hole extending to the base board.

2. The stamping tray of claim 1, wherein:
the plurality of compression members corresponds in position to a position of the workpieces to be scrapped.

3. The stamping tray of claim 1, wherein:
the tray body defines at least one stamping groove; and
the plurality of mounting grooves is arranged at intervals in the at least one stamping groove.

4. The stamping tray of claim 3, wherein:
the tray body comprises at least one mounting end and a stamping portion;
the at least one stamping groove is defined in the stamping portion; and
the tray body is mounted on the base board by the at least one mounting end.

5. The stamping tray of claim 4, wherein:
the tray body comprises two mounting ends located at opposite sides of the stamping portion, respectively.

6. The stamping tray of claim 4, wherein:
the at least one mounting end comprises a plurality of positioning members for mounting the tray body on an external conveying device.

7. The stamping tray of claim 6, wherein:
the at least one mounting end comprises a foolproof member.

8. The stamping tray of claim 7, wherein:
the plurality of positioning members and the foolproof member are hollow.

9. A stamping tray comprising:
a tray body defining a plurality of stamping grooves arranged at intervals and a plurality of mounting grooves arranged within the plurality of stamping grooves, each of the plurality of mounting grooves configured to receive a workpiece to be scrapped, each of the plurality of stamping grooves defines an equal plurality of the mounting grooves; and
a base board mounted on a side of the tray body away from the plurality of mounting grooves the base board comprises a plurality of compression members; wherein:

each of the plurality of mounting grooves defines a through hole extending to the base board;
and
the tray body is sleeved on the base board by the plurality of compression members passing through the plurality of through holes.

10. The stamping tray of claim 9, wherein:
the tray body comprises two mounting ends;
each of the two mounting ends comprises a plurality of positioning members for mounting the tray body on an external conveying device.

11. The stamping tray of claim 10, wherein:
the tray body comprises a foolproof member on one of the two mounting ends for limiting a mounting direction of the tray body on the external conveying device.

\* \* \* \* \*